United States Patent [19]
Ueta

[11] Patent Number: 5,713,580
[45] Date of Patent: Feb. 3, 1998

[54] METALLIC GASKET

[75] Inventor: Kosaku Ueta, Saitama-ken, Japan

[73] Assignee: Japan Metal Gasket Co., Ltd., Japan

[21] Appl. No.: 756,269

[22] Filed: Nov. 25, 1996

Related U.S. Application Data

[62] Division of Ser. No. 417,451, Apr. 5, 1995, Pat. No. 5,618,049, which is a continuation of Ser. No. 72,134, Jun. 4, 1993, abandoned.

[51] Int. Cl.$^6$ ...................................................... F16J 15/40
[52] U.S. Cl. ........................ 277/180; 277/235 B; 277/236
[58] Field of Search .......................... 277/180, 235 B, 277/236, 235 R, 235 A

[56] References Cited

U.S. PATENT DOCUMENTS

| | | | |
|---|---|---|---|
| 4,721,315 | 1/1988 | Ueta | 277/235 B |
| 4,799,695 | 1/1989 | Yoshino | 277/231 |
| 4,836,562 | 6/1989 | Yoshino et al. | 277/235 B |
| 5,161,809 | 11/1992 | Matsushita | 277/235 B |
| 5,205,566 | 4/1993 | Ueta et al. | 277/180 |
| 5,286,039 | 2/1994 | Kawaguchi et al. | 277/180 |
| 5,294,134 | 3/1994 | Kawaguchi et al. | 277/235 B |
| 5,348,315 | 9/1994 | Kawaguchi et al. | 277/235 B |

FOREIGN PATENT DOCUMENTS

| | | | |
|---|---|---|---|
| 0306766 | 3/1989 | European Pat. Off. | |
| 459060A1 | 12/1991 | European Pat. Off. | F16J 15/08 |
| 485693A1 | 5/1992 | European Pat. Off. | F16J 15/12 |
| 494489A1 | 7/1992 | European Pat. Off. | F02F 11/00 |
| 60-440540 | 1/1985 | Japan. | |
| 608465 | 9/1985 | Japan. | |
| 320626 | 7/1987 | Japan. | |
| 62-155376 | 7/1987 | Japan. | |
| 62-224772 | 10/1987 | Japan. | |
| 258502 | 11/1987 | Japan. | |
| 62-181756 | 11/1987 | Japan | 277/235 B |
| 62-261761 | 12/1987 | Japan. | |
| 0079471 | 3/1989 | Japan | 277/235 B |
| 0083842 | 3/1989 | Japan | 277/235 B |
| 01065367 | 3/1989 | Japan. | |
| 66-465367 | 3/1989 | Japan. | |
| 01104953 | 4/1989 | Japan. | |
| 0211660 | 8/1989 | Japan | 277/235 B |

*Primary Examiner*—Daniel G. DePumpo
*Attorney, Agent, or Firm*—Young & Basile, P.C.

[57] ABSTRACT

In a metallic gasket in which a plate member having at least one flexible metal plate has a hole, a flat portion formed at the periphery of the hole and a bead disposed concentrically with the hole to the outside of the flat portion is sandwiched between joining faces, an annular stopper is secured to the plate member at a position corresponding to the flat portion on the side of the hole. The stopper is made of a metal material different from the plate member and formed to an increased thickness at a portion for a larger gap, and formed to a decreased thickness at a portion for a smaller gap depending on the difference of the size of the gap between the joining faces.

3 Claims, 3 Drawing Sheets

METALLIC GASKET

This application is a division of application Ser. No. 08/417,451, filed on Apr. 5, 1995, now U.S. Pat. No. 5,618,099 which is a continuation of Ser. No. 08/072,134 filed on Jun. 4, 1993 now abandoned.

BACKGROUND OF THE INVENTION

1. Field of the Invention

The present invention concerns a metallic gasket disposed between joining faces of a cylinder head and a cylinder block in an internal combustion engine to prevent combustion gas blow through and cooling water and lubricant or the like from leaking.

2. Description of the Prior Art

In an internal combustion engine, a gasket is interposed between a cylinder block and a cylinder head to provide a seal therebetween. In particular, a seal at the periphery of a combustion chamber, that is, a cylinder bore, is important and, if the seal is defective at that portion, the combustion gas in the bore blows out to decrease the gas pressure efficiency and the expected power output can not be obtained.

The gasket materials for a gasoline engine use a mixture of asbestos and rubber having a spiked steel plate embedded therein. A bore side peripheral edge covered with a stainless steel plate and the peripheral edge of bolt holes covered with a copper plate, respectively, are used as a countermeasure for a gap between the edge seal and the joining faces.

Further, for a diesel engine, a material comprising a mixture of asbestos and rubber and a wire gauze embedded therein is used as a countermeasure for a gap at the edge seal and the joining faces as described above and a fire ring is further engaged along the edge of the bore.

Such gaskets are referred to as soft gaskets. However, since asbestos is used in these gaskets, its further use has become restricted, particularly, in view of environmental problems.

As far as the inventor knows, synthetic fibers are used instead of asbestos in gasoline engines. Further, for diesel engines, a structure comprising a steel laminate including a steel plate formed with a minute bead, a stainless steel subplate stacked thereon and a steel wire core is disposed to the bore peripheral edge. The subplate is folded back to cover the wire on the inside and extends along the upper surface of the edge of the bore hole. A baked rubber seal is disposed at the bolt holes.

Further, there are also a prior art gasket as shown in FIG. 8 in which a stopper 4 comprising a shim is formed at a flat portion adjacent a bead 2 of an elastic steel or iron base plate 1 on the side of a bore hole, a gasket as shown in FIG. 7 in which a stopper 3 is formed by arc plasma spray at a flat portion adjacent a bead 2 of an elastic base plate 1 on the side of a bore hole, and a gasket with two intermediate plates bent outside with each other to open at a bore edge on which a stopper is also formed by arc plasma spray, not illustrated.

The soft gaskets are not satisfactory for providing reduced thickness or endurance to cope with decreasing distance between bores required by the recent trend of engine weight and size reduction, material recycling, heat resistance, high performance, cost reduction and freedom of design. Eventually, the demand for metallic gaskets will increase in the automobile industry.

By the way, in a metallic gasket, a bead is formed along the periphery of holes, in particular, at the periphery of cylinder bore holes. When a metallic gasket is tightened between a cylinder head and a cylinder block, the bead is elastically deformed to function as a seal. Further, a stopper is formed in an annular shape from the bead toward the cylinder bore hole, that is, at the periphery of the bore hole in the metallic gasket. The stopper, by its thickness, suppresses vibrations at the joined area between the cylinder block and the cylinder head caused by the engine operation so that it also functions as a sealing member to prevent fatigue failure due to engine vibration. In the metallic gasket, a complete seal is provided by obtaining a primary seal with the stopper and a secondary bead seal compensated with the durability by the stopper. The stopper must have a thickness corresponding to a gap in the engine, that is, a gap between the joined faces of the cylinder block and the cylinder head.

Recently, with performance improvement due to the progress in the engine technology, fuel economy and size and weight reduction, the distance between bores has been reduced and the rigidity of the engine has been reduced considerably. As a result, it is necessary to further increase the tightening pressure in view of the requirement for sealing an increasing explosive pressure and, inevitably, the spring force of the bead has to be increased. When such a highly elastic gasket is placed between the joining faces of the cylinder block and the cylinder and tightened with an enormous force, the surface pressure increases excessively near the bolts due to the tightening and the reduced gap between the joining faces. On the other hand, the surface pressure decreases near the mid portion between the bolts and tends to increase the gap between the joining faces.

Accordingly, when a gasket is fabricated with a stopper by using a shim having an identical thickness over the entire surface, the surface pressure between the joining faces at the periphery of the cylinder bore can not be uniform and, if tightening is applied excessively to attain a seal over the entire periphery, distortions occur at the periphery of the cylinder bore which deform the cylinder bore. Then it becomes difficult to ensure circularity of the cylinder bore due to uneven tightening pressure.

A stopper formed by arc plasma spray can cope with the difference in thickness depending on its position; but it has a drawback in that since the welding efficiency of the plasma spray is extremely low, the dimensional accuracy can not be easily ensured and, further, sufficient sealing can not be obtained with a low spray density.

Although examples of internal combustion engines have been described, that is, a gasoline engine or a diesel engine, similar problems, of course, exist due to unevenness of the surface pressure at the joining faces of a crank case or a differential case.

As an example of the metallic gasket in the relevant prior art, the inventor has accomplished inventions disclosed in Japanese Patent Laid-Open Hei 1 (1989)-104953, European Patent Application Laid-Open No. 0306766 and Japanese Patent Publication Hei 2 (1990)- 58502 and, further, is aware of Japanese Patent Laid-Open Sho 62 (1987)-155376 and Japanese Patent Publications Hei 3 (1991)-20626 and Hei 4 (1993)-40540.

SUMMARY OF THE INVENTION

This invention has been accomplished in view of the foregoing situation and it is an object thereof to provide a metallic gasket capable of making the surface pressure uniform around the periphery of cylinder bores and, particularly, capable of ensuring the circularity of the cylinder bores.

To attain the foregoing object, the present invention provides a metal gasket to be disposed between joining faces in which a plate member has at least one elastic metal plate with a hole, a flat portion at the periphery of the hole and a bead disposed to the outside of the flat portion concentrically with the hole. A stopper made of a metal material independent from the plate member is secured to the plate member at a position corresponding to the flat portion on the side of the hole, such that it is formed to an increased thickness for a large gap, while being formed to a decreased thickness at a portion corresponding for a smaller gap depending on the size of the gap at the joining faces.

The gasket is applicable to joining faces of an engine, crank case, and differential case, as well as to all other equipment using a gasket.

In a case where the gasket is sandwiched between the joining faces of a cylinder block and a cylinder head of an engine, the hole on the plate member of the gasket may be a cylinder bore hole corresponding to an engine cylinder bore or a water hole or an oil hole.

The plate member comprises at least one elastic metal plate, preferably, a laminated structure of a base plate and a subplate, in which the hole is formed at the identical corresponding portions of each of the base plate and the subplate. Further, the bead is disposed and welded to the inner periphery of the base plate and the annular stopper is disposed on the subplate, respectively. However, the stopper may be disposed on the base plate.

The stopper is preferably formed by press molding using a metal mold.

When the plate member comprises two base plates and the subplate, the gasket may be constituted by disposing a bead on each of the two base plates, opposing the base plates with the tops of their beads, that is, the rear sides of the bead are concave facing each other, and sandwiching a laminate member comprising a subplate and a compensation plate thinner than the subplate therebetween, disposing a stopper having a thickness which is predetermined by the size of the gap between the joining faces along the entire inner periphery of the hole in the subplate and folding back the compensation plate to hold the stopper at that position. In this case, the stopper site exits at a position corresponding to the position of the flat portion of the base plate on the side of the hole.

Further, as described above, when the plate member comprises the base plates and the subplate, the gasket may also be constituted by disposing a flat portion on the side of the hole and a bead situated on the outer circumference thereof on each of the two base plates, respectively, opposing the base plates with the tops of their beads, that is, rear sides of the bead are concave facing each other, sandwiching a laminate of two upper and lower subplates therebetween, disposing the inner periphery of the hole of one of the subplates to the outside of the inner periphery of the hole of the base plate, while disposing the inner periphery of the hole of the other subplate at a position aligned with the inner periphery of the hole in the base plate to constitute a shelf-like edge on the periphery of the hole in the other of the subplates, and welding and fixing a stopper having a predetermined thickness depending on the size of the gap between the joining faces over the entire circumference on the shelf-like edge, that is, at a position corresponding to the flat portion such that the mid portion for the thickness of the stopper faces the inner peripheral end of the upper subplate.

In a further embodiment, a simple construction can be attained by disposing a flat portion on the side of the hole and a bead situated to the outer circumference thereof, respectively, to each of the two upper and lower base plates, opposing the base plate with each of their bead tops, that is, the rear sides of the bead are concave facing each other, and welding a stopper having a thickness that is predetermined depending on the size of the gap between the joining faces over the entire circumference.

Further, in a case where the plate member comprises the base plates and the subplate as described above, the gasket may further be constructed by disposing a flat portion on the side of the hole and a bead situated on the outer circumference thereof to each of the two base plates, opposing the base plates with each of their bead tops, that is, the rear sides of the bead are concave facing each other, sandwiching a subplate between the base plate, making a hole in the subplate larger than the width of the flat portion, welding and fixing a stopper of a trapezoidal cross section having the stopper on the inner peripheral end of the hole in the substrate, the inner thickness $l_3$ being greater than the outer thickness $l_1$, press molding the thus fixed stopper corresponding to the size of the gap between the joining faces that is predetermined over the entire circumference, and thereby forming the stopper to a thickness $l_2$ from the lateral mid portion to the inner peripheral end. Suitably, the stopper has a maximum thickness $l_3$ before molding which is greater by more than 50% of (maximum molding thickness $l_2$-minimum molding thickness $l_1$) $t_2$.

In this way, when the stopper is molded into a trapezoidal cross section with the inner thickness $l_2$ of the stopper greater than the outer thickness $l_1$ thereof, a sufficient difference in the thickness can be provided for the entire circumference. Further, the thickness $l_3$ before molding has such a shape so as to be easily moldable to a size conforming the gap between the joining faces. That is, the stopper is disposed at a portion of a plate member corresponding to the flat portion on the side of the hole in the base plate.

In this metallic gasket, since the stopper is molded from a metal material separate from that of the base member such that it is formed to an increased thickness for a larger gap or formed to a decreased thickness for a smaller gap depending on the size of the gap between the joining faces, fabrication accuracy is high. Further, since the stopper is aligned with the size of the gap, the surface pressure around the hole in the joining faces is made uniform thereby providing an accurate seal. In particular, when the gasket is applied to the joining faces between the cylinder block and the cylinder head of an engine, tightening pressure at the joining faces is made uniform and there is no need for excessive tightening and, accordingly, there is no possibility of deformation around the cylinder bore so that circularity of the cylinder bore can be ensured.

DESCRIPTION OF THE PREFERRED EMBODIMENTS

EXAMPLE 1

Figure 1:
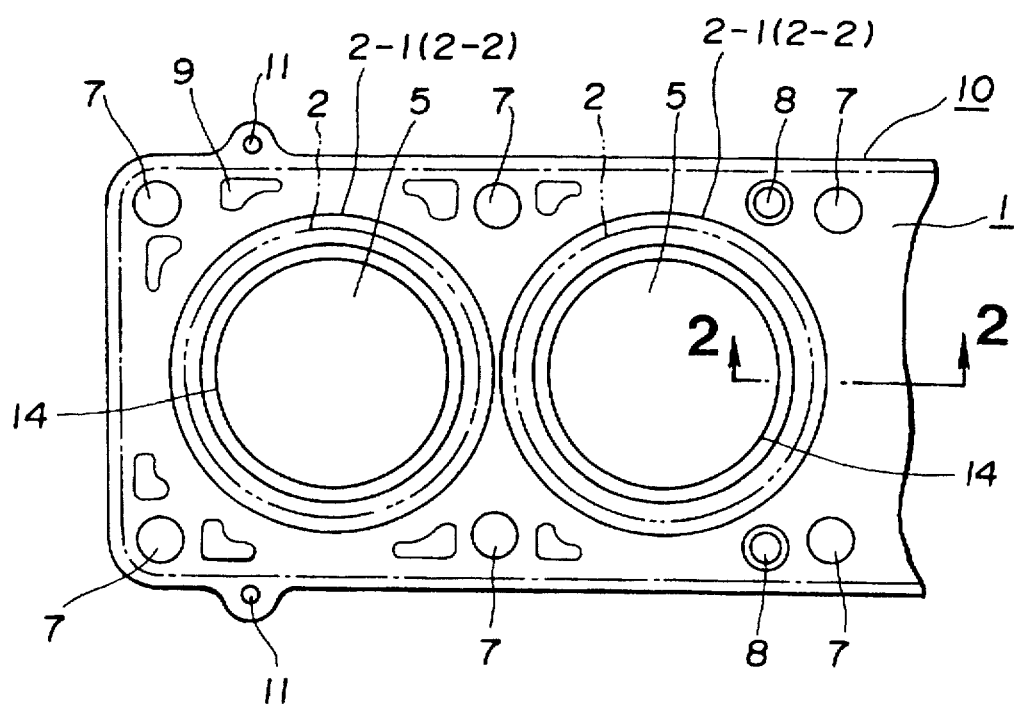
FIG. 1 is a plan view of a typical embodiment of a metallic gasket of the present invention.

As shown in FIG. 1, a metallic gasket to be sandwiched between joining faces of a cylinder block and a cylinder head of an engine is entirely depicted as reference numeral 10 and comprises a metal plate member 1 in which a cylinder bore hole 5 is disposed. Oil holes 8 and water holes 9 are also formed as holes in the metal plate member 1. In FIG. 1, reference numeral 7 denotes a bolt hole.

In this embodiment, the invention is applied to the circumferential periphery of the cylinder bore hole 5.

Figure 2:
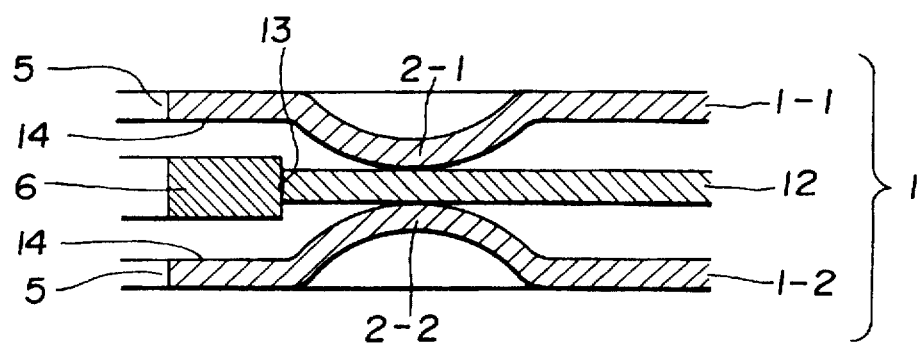
FIG. 2 is a cross sectional view taken along line 2—2 in FIG. 1.

As can be seen, particularly, from FIG. 2, the metal plate member 1 has a laminate structure comprising two elastic metal plates base plates 1-1 and 1-2 having a subplate 12 made of a metal plate disposed therebetween.

As can be seen from FIGS. 1 and 2, each of the base plates 1-1 and 1-2 has a concentric flat portion 14 at the periphery of the cylinder bore hole 5 and beads 2-1, 2-2, respectively, also concentrical with the cylinder bore hole 5 and formed to the outer side of the flat portion 14.

The base plates 1-1 and 1-2 are opposed in parallel to each other, with each of the tops of the beads 2-1 and 2-2 formed on each of the base plates, that is, protrusions formed on the side opposite to the concave side of each bead (the center being shown as reference numeral 2 in FIG. 1) being opposed to each other.

As seen from FIG. 2, the inner peripheral end of the cylinder bore hole 5 in the subplate 12 is at a position retracted or spaced from the cylinder bore hole 5 of the upper and lower base plates 1-1 and 1-2 and disposed adjacent to the portion of the beads 2-1 and 2-2 at the periphery thereof near the cylinder bore hole 5. That is, the cylinder bore hole 5 in the subplate 12 is greater in diameter than that of the cylinder bore hole 5 in each of the upper and the lower base plates 1-1 and 1-2.

A stopper shown by reference numeral 6 in FIG. 2 is an annular metal plate member independent from the base plates 1-1, 1-2, and having a 1 mm to 3 mm width and a thickness greater than that of the sub-plate 12. The stopper 6 is formed by a metal mold. The stopper 6 is welded and secured after molding to the inner circumferential end 13 of the cylinder bore hole 5 in the subplate 12. Molding may, of course, also be applied after securing the stopper 6 to the plate member 1.

The stopper 6 is located at a position corresponding to a flat portion 14 of the plate member 1, that is, the base plates 1-1 and 1-2 near the cylinder bore hole 5.

The stopper 6 supports the flat portion 14 when the beads 2-1 and 2-2 of the elastic metal plates 1-1 and 1-2 are diverged and deformed by vibrations of the engine or by the joining pressure at the joining faces, thereby suppressing excessive deformation or excessive vibrations of the beads 2-1 and 2-2.

The stopper 6 is formed by a press using a metal mold with a prior adjustment to a thickness corresponding to the size of the gap between the joining faces of the cylinder block and the cylinder head of the engine over the entire circumference thereof.

Bolt holes 7 are disposed at several positions around the cylinder bore hole 5 and equally spaced circumferentially into four sections. The stopper 6 is formed by using a metal mold that decreases the thickness of the stopper 6 at a portion near the bolt hole 7 and increases the thickness thereof at a mid portion between the bolt holes 7.

It will be apparent that the various forming methods can be selected and not restricted only to the use of the described metal die.

The stopper 6 is beforehand formed corresponding to the gap between the joining faces, but it is not restricted only to this method. The stopper 6 may be secured to a plate member 1 (base plate 1-1 in this case) and then molded to the size of the predetermined gap between the joining faces.

The plate member 1 is integrated by spot welding at equally spaced positions.

In this way, according to this preferred embodiment, the metallic gasket 10 can cope with the gap between the joining faces of the cylinder block and the cylinder head by only the formed stopper 6 and can provide an effective seal to ensure good circularity for the cylinder bore with no deformation around the cylinder caused by excessive surface pressure between the joining faces. In this case, marks, with reference to the circumferential position to the base plate 1-1, on the periphery of the cylinder bore of the base plate 1-1 and on the stopper 6, can be conveniently used for aligning the thickness of stopper 6.

EXAMPLE 2

Figure 3:
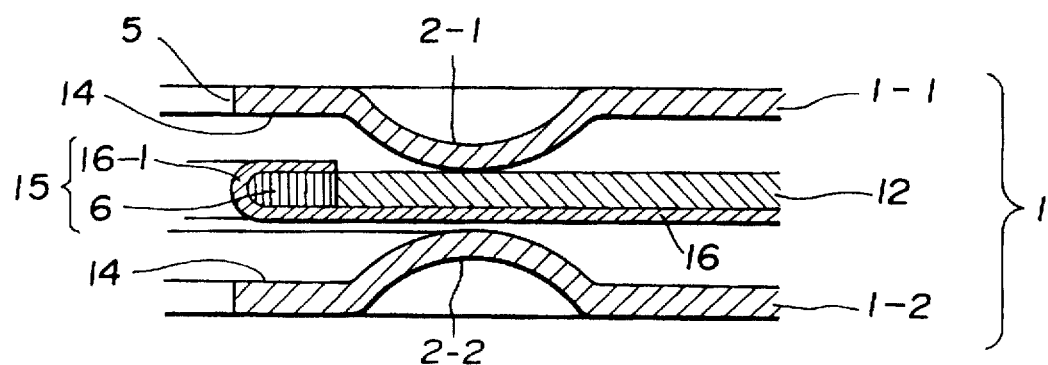
FIG. 3 is a cross sectional view of a portion of another embodiment of the present invention.

FIG. 3 shows another preferred embodiment. In this embodiment, two base plates 1-1 and 1-2 each having a flat portion 14 adjacent to a cylinder bore hole 5 formed to the inside thereof and beads 2-1, 2-2 formed concentrically with the cylinder bore hole 5 disposed to the outer circumference thereof are disposed in parallel, with the rear sides of the concave portions of the beads 2-1 and 2-2 facing each other. A metal plate laminate 15 comprising a subplate 12 and a compensation plate (grommet plate) 16 thinner than the subplate 12 and disposed below and in parallel with the subplate 12 is disposed between the base plates 1-1, 1-2.

The subplate 12 used herein is a metal plate the thickness of which is selected so as to determine the thickness of the gasket including the base plates 1-1 and 1-2, and the compensation plate 16, disposed in parallel below, is a metal plate having a thickness less than that of the base plates 1-1 and 1-2.

The cylinder bore hole 5 in the subplate 12 has a diameter greater than that of the cylinder bore hole 5 in the base plates 1-1, 1-2, and an annular stopper 6 is disposed along the inner periphery of the cylinder bore hole 5 at a position corresponding to the flat portion 14 of the base plates 1-1 and 1-2. The stopper 6 is previously press formed by a metal mold to a thickness corresponding to the gap between the joining faces so that it matches the gap between the joining faces which is different depending on the position thereof. It will be apparent that various molding methods may be selected.

Further, the compensation plate 16 used herein has a fold-back portion 16-1 formed on the side of the bore hole 5. The stopper 6 is held in position by folding the fold-back portion 16-1 of the compensation plate 16 upward, and extending it over the upper surface of the stopper 6 while covering the inner peripheral end thereof.

Accordingly, the thickness of stopper 6 is increased and compensated by the thickness of the fold-back portion 16-1 of the compensation plate 16.

In this way, the thickness of the stopper 6 can be decreased as desired and the strength of stopper 6 can be compensated by increasing the thickness of the compensation plate 16 by a predetermined amount.

Also in this case, the plate member 1 is integrated by grommet bonding (eyelet) at the holes 11 at equally spaced positions.

EXAMPLE 3

Figure 4:
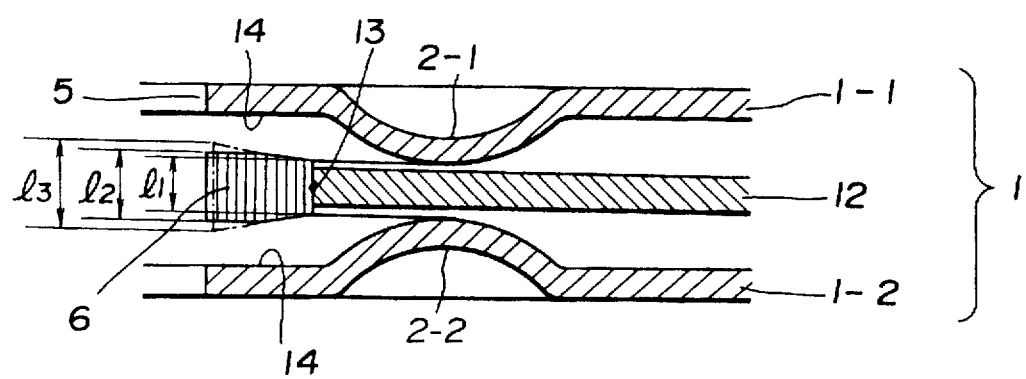
FIG. 4 is a cross sectional view of a portion of another embodiment of the present invention.

FIG. 4 shows a different embodiment.

Two base plates 1-1 and 1-2, each having a flat portion 14 having an adjacent cylinder bore hole 5 formed at the inside thereof and beads 2-1, 2-2 concentrically formed to the cylinder bore hole 5 and situated outside of the outer circumference thereof, are disposed in parallel with each other at a position such that the rear sides of the concave portion of the beads 2-1 and 2-2 face each other. A subplate 12 is disposed between the base plates 1-1 and 1-2.

The diameter of the cylinder bore hole 5 in the subplate 12 is made greater than that of the cylinder bore holes 5 in the upper and lower base plates 1-1 and 1-2.

Then, an annular stopper 6 similar to that in the previous embodiment is secured at the outer peripheral end face thereof to the inner peripheral end face of the bore hole in the subplate 12. The stopper 6 has a trapezoidal cross section as shown by the dotted chain line before molding. The thickest portion at the inner peripheral end has a thickness $l_3$, while the thinnest portion at the outer peripheral end has a thickness $l_1$. When the stopper 6 is press molded, upper and lower horizontal surfaces are formed from the lateral mid portion, and a maximum molding size $l_2$ is formed from the horizontal portion to the inner peripheral end. The stopper 6 may be entirely molded beforehand by using a metal die, or a metal die may be used only for molding the trapezoidal form, and press molding may be applied to obtain a final shape. Further, molding may, of course, be applied after or before securing the stopper 6 to the subplate 12.

The thickness $L_2$ is previously determined depending on the size of the gap between the joining faces over the entire circumference thereof.

In adjusting the thickness of the stopper 6, it is molded such that it has a dimensional relationship: $l_2 > l_1$. This facilitates the procedure of first securing the stopper 6 to the subplate 12 and, subsequently, molding the size of the stopper 6 corresponding to the gap which differs depending on the position of the joining faces.

Then, in a case of adjusting the thickness by the molding fabrication, it is preferable to make the stopper 6 such that the thickness $l_1$ is set to a minimum value for the molded size, and the value $l_3$ for the dimension before molding is made greater by 50% (maximum molded size value $l_2$—minimum molded size value $l_1$) $l_2$ to provide a sufficient range for adjustment.

Also in this case, the plate member 1 is integrated by grommet bonding at the holes 11 shown in FIG. 1 at equally spaced positions.

EXAMPLE 4

Figure 5:
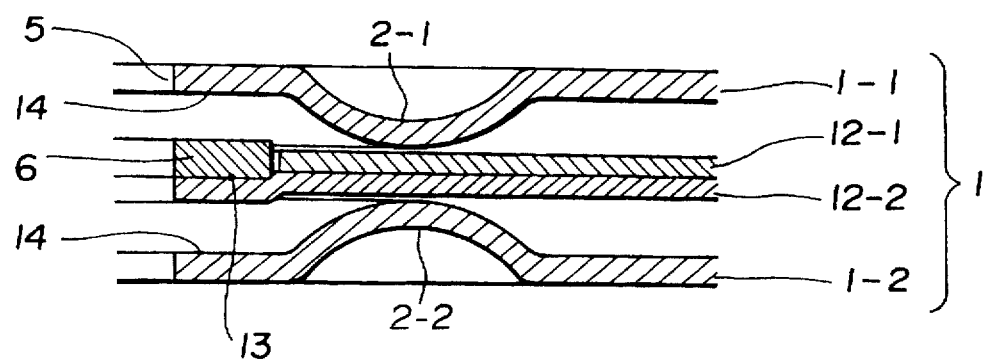
FIG. 5 is a cross sectional view of a portion of yet another embodiment of the present invention.

FIG. 5 shows a variation of a preferred embodiment of the present invention. When the plate member 1 includes the base plates 1-1 and 1-2 and the subplate 12, each of the two base plates 1-1 and 1-2 has a flat portion 14 adjacent to the cylinder bore hole 5 formed at the inside and beads 2-1, 2-2 disposed at the outer circumference thereof. The base plates 1-1 and 1-2 are opposed to each other with the respective tops of the beads 2-1 and 2-2, that is, the rear sides of the concave portions of each bead being opposed to each other. Upper and lower two subplates 12-1 and 12-2 are laminated and sandwiched between the base plates 1-1, 1-2. The inner periphery of the cylinder bore hole 5 in the upper subplate 12-1 is disposed outside of the inner periphery of the cylinder bore holes 5 in the base plates 1-1 and 1-2 within a range of the flat portion 14, while the inner periphery of the cylinder bore hole 5 in the lower subplate 12-2 is situated at a position aligned with the inner periphery of the cylinder bore holes 5 of the base plates 1-1 and 1-2. A length from the inner periphery of the cylinder bore hole 5 to the flat portion 14 is constituted as a stepped-down like edge, and a stopper 6, the thickness of which is previously determined depending on the size of the gap between the joining faces, is welded and secured on the shelf-like edge, that is, at a position corresponding to the flat portion 14 while opposing the mid portion of the thickness thereof to the inner peripheral end of the subplate 12-1.

Although the stopper 6 is previously molded by a metal die, it is apparent that the molding method is not restricted thereto.

In this way, adjustment of the thickness of the stopper 6 to the gap between the joining faces and the improvement of the sealing function can be facilitated.

Also, in this case, the plate member 1 is entirely integrated by grommet bonding at the holes 11 in FIG. 1 at equally spaced positions.

EXAMPLE 5

Figure 6:
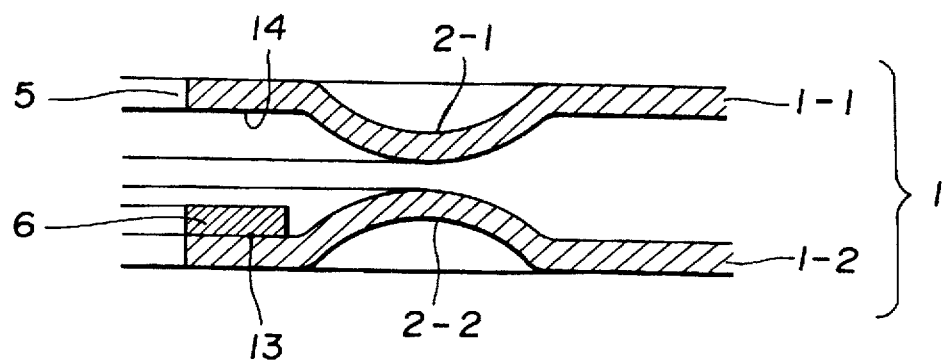
FIG. 6 is a cross sectional view of a portion of another embodiment of the present invention.
Figure 7:
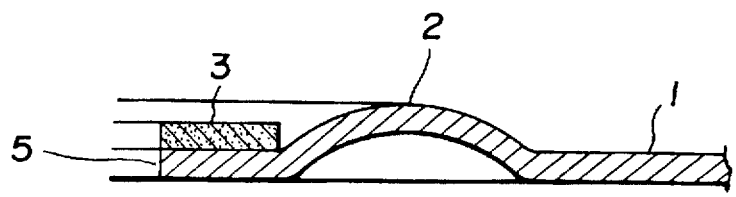
FIG. 7 is a cross sectional view of an embodiment in the prior art.
Figure 8:
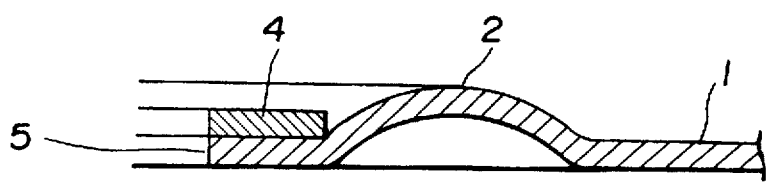
FIG. 8 is a cross sectional view of another embodiment in the prior art.

FIG. 6 shows a yet another embodiment of a simple structure in which the metal plate member 1 comprises only base plates 1-1 and 1-2.

In this embodiment, the two base plates 1-1 and 1-2 have a flat portion 14 having a cylinder bore hole 5 being formed adjacent inside thereof and a bead 2-1, 2-2 disposed to the outer circumference thereof. The base plates 1-1 and 1-2 are opposed with the tops of beads 2-1 and 2-2, that is, the rear sides of the concave portion of the beads 2-1 and 2-2, being opposed to each other. Then, an annular stopper 6 press molded to a thickness previously calculated to the size of the gap between the joining faces is welded and secured on the flat portion 14 of the lower base plate 1-2.

Also, in this case, the plate member 1 is integrated by grommet bonding at the holes 11 in FIG. 1 at equally spaced positions.

According to the present invention, since the stopper is made of a different material from that of the plate, and the thickness of the stopper is predetermined to the size of the gap which varies depending on the position of the joining faces, it can be sandwiched between the base plates to accurately match the gap and can provide an effective seal without being hampered by the restriction of the plate thickness. Then, the surface pressure around the holes can be made uniform and, uneven surface pressure on the joining face can be avoided around the cylinder bore seal so that the circularity of the cylinder bore can be ensured. Also a very safe and high performance gasket can be obtained in which a primary seal is provided by the stopper and a secondary seal is provided by the beads.

What are claimed are:

1. A metallic gasket positionable between two joining faces connected together by a tightening bolt and forming a gap therebetween across the metallic gasket, said gasket formed of a plate member having at least one elastic metal plate with a hole, a flat portion formed at the periphery of the hole and a bead disposed around the flat portion concentrically with the hole, the metallic gasket comprising:

an annular stopper made of a metal material different from the plate member and having a varying preformed thickness along the entire circumference thereof depending on a distance from the tightening bolt, wherein the plate member comprises a laminate structure of base plates and a sub-plate the hole in the plate member formed of concentric holes formed at corresponding positions of the base plates and the sub-plate, respectively, the base plates having the flat portion and the bead concentric with and disposed around the flat portion at the periphery of the hole in each base plate, the sub-plate securing the annular stopper to the inner circumferential end of said sub-plate, wherein the stopper is disposed at a position corresponding to the flat portion on the base plates.

2. A metallic gasket positionable between two joining faces connected together by a tightening bolt and forming a gap therebetween across the metallic gasket, said gasket formed of a plate member having at least one elastic metal plate with a hole, a flat portion formed at the periphery of the hole and a bead disposed around the flat portion concentrically with the hole:

wherein the plate member comprises a laminate structure of first and second base plates and a sub-plate sandwiched therebetween, the hole in the plate member formed of concentric holes formed at corresponding positions of the first and second base plates and the sub-plate, respectively, the first and second base plates having the flat portion and the bead concentric with and disposed around the flat portion at the periphery of the hole in each base plate, the sub-plate securing an annular stopper to the inner circumferential end of said sub-plate, wherein the stopper is disposed at a position corresponding to the flat portion on the base plates, the annular stopper made of a metal material different from the plate member and having a continuously varying preformed thickness along the entire circumference thereof depending on a distance from the tightening bolt, the varying preformed thickness being not substantially changed by deformation of the annular stopper after positioned between the two joining surfaces and tightened by the tightening bolt, the varying preformed thickness being larger than a thickness of the sub-plate.

3. A metallic gasket for sealing between two joining surfaces of two structural members of a internal combustion engine, the metallic gasket comprising:

a first base plate formed of an elastic metal plate having a hole formed therethrough, a flat portion formed at a peripheral portion of the hole with a predetermined width, and a bead formed surrounding the flat portion concentrically with the hole;

a second base plate formed of an elastic metal plate having a hole formed therethrough at a corresponding portion to the hole of the first base plate, a flat portion formed at a peripheral portion of the hole with the predetermined width, and a bead formed surrounding the flat portion concentrically with the hole;

a subplate formed of a substantially flat metal plate interposed between the first and second base plates; the subplate having a hole formed coaxially with the holes of the first and second base plates, the holes of the subplate having a diameter larger than that of the holes of the first and second base plates so that an inner peripheral face of the hole is adjacent to inner circumferential edges of the beads of the first and second plates;

the first and second base plates being disposed vertically and symmetrically with respect to the subplate so that the subplate is sandwiched between protruding portions of the beads of the first and second base plates; and a stopper formed of an annular metal plate having a thickness larger than that of the subplate, so that upper and lower surfaces of the stopper respectively protrude upwardly and downwardly with respect to upper and lower surfaces of the subplate, the stopper being secured to the subplate with an outer peripheral face secured to the inner peripheral face of the hole of the subplate so that the stopper is positioned between flat portions of the first and second base plated, the thickness of the stopper being preformed in accordance with a magnitude of a gap between the two joining surfaces, the preformed thickness being varied along the entire circumference thereof depending on a distance from the tightening bolt.

* * * * *